United States Patent [19]

Lapp

[11] 4,106,164

[45] Aug. 15, 1978

[54] DEVICE FOR ABSORBING SHOCK IN A CABLE

[76] Inventor: Ellsworth W. Lapp, c/o Lapp Engineering, 6060 11th St., Rockford, Ill. 61109

[21] Appl. No.: 735,371

[22] Filed: Oct. 26, 1976

[51] Int. Cl.² ............................................. B65D 63/00
[52] U.S. Cl. ...................................... 24/16 R; 24/18; 24/135 L
[58] Field of Search .................... 24/16 R, 20 R, 20 S, 24/18, 135 L; 254/69; 267/164, 165, 137, 73

[56] References Cited

U.S. PATENT DOCUMENTS

| 222,336 | 12/1879 | Wickham | 24/135 L |
|---|---|---|---|
| 818,354 | 4/1906 | Comstock | 24/18 |
| 1,200,372 | 10/1916 | Lay | 24/18 |
| 1,475,245 | 11/1923 | Rothermel | 24/18 |
| 2,142,952 | 1/1939 | Rathgeber | 24/18 |
| 2,478,184 | 8/1949 | Elliott | 24/18 |
| 4,013,266 | 3/1977 | Lapp | 254/69 |

FOREIGN PATENT DOCUMENTS

| 1,146,490 | 11/1957 | France | 24/18 |
|---|---|---|---|
| 647,073 | 10/1962 | Italy | 24/135 L |

Primary Examiner—Werner H. Schroeder
Assistant Examiner—Moshe I. Cohen
Attorney, Agent, or Firm—Leydig, Voit, Osann, Mayer & Holt, Ltd.

[57] ABSTRACT

The two overlapped end portions of a tensioned cable are secured together by a clamp having a resiliently yieldable strap which is bowed so as to permit elongation of the cable when the latter is subjected to shock loads.

6 Claims, 6 Drawing Figures

DEVICE FOR ABSORBING SHOCK IN A CABLE

BACKGROUND OF THE INVENTION

This invention is concerned with preventing snapping of a tensioned cable when the cable is subjected to a sudden tensile shock load.

SUMMARY OF THE INVENTION

One of the aims of the present invention is to provide a new and comparatively inexpensive shock absorber which is adapted to be clamped to a tensioned cable and which, when the cable is subjected to a high tensile shock load, automatically permits elongation of the cable so as to prevent the cable from snapping apart under the shock load.

A further aim is to provide a unique shock absorbing-clamp adapted to slice together the two lapped end portions of a tensioned cable and adapted to permit elongation of the cable when the cable is subjected to tensile shock loads.

A more detailed object is to provide a shock absorbing clamp having a pair of eyes for receiving the cable end portions and having a resiliently yieldable strap connected to and extending between the eyes, the strap being formed with a bowed intermediate portion which normally maintains tension in the cable but which flexes and permits elongation of the cable when a tensile shock load is applied to the cable.

The invention also resides in the unique method of splicing and tensioning a cable through the use of the new and improved shock absorbing clamp.

These and other objects and advantages of the invention will become more apparent from the following detailed description when taken in conjuction with the accompanying drawings.

DETAILED DESCRIPTION OF THE PREFERRED EMBODIMENT

Figure 1:
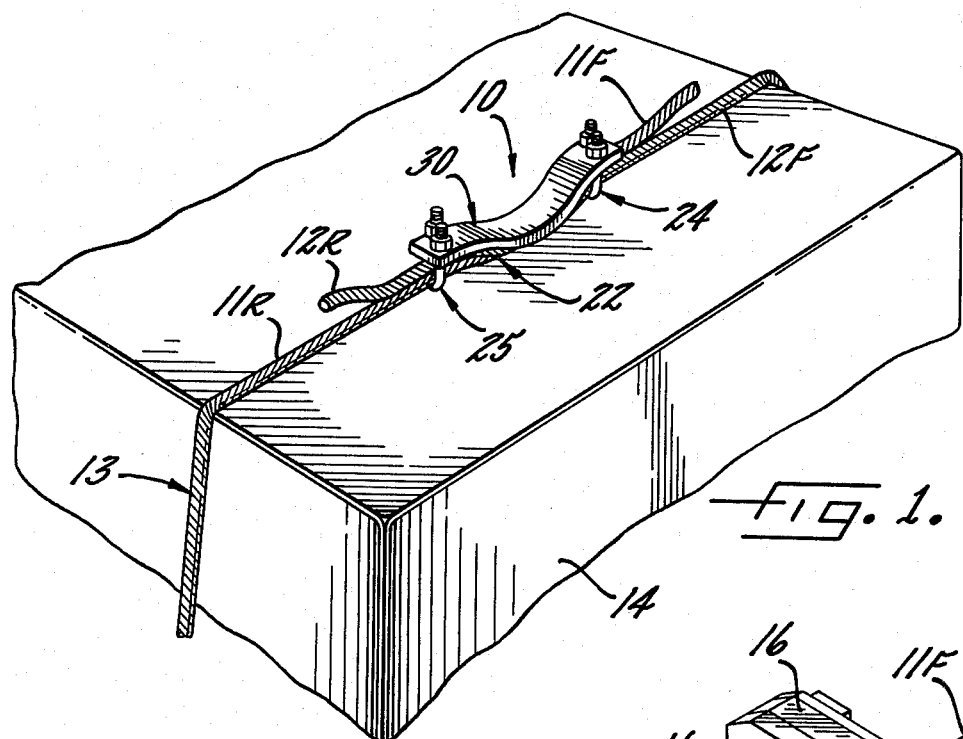
FIG. 1 is a fragmentary perspective view showing a cable wrapped around an article and having its end portions spliced together by a new and improved shock absorbing clamp incorporating the unique features of the present invention.

As shown in the drawings for purposes of illustration, the invention is embodied in a device 10 for clamping together the two overlapped end sections 11 and 12 of a cable 13 in order to keep the cable tensioned around an article 14. In the present instance, the cable shown is of the braided wire or wire rope type but it should be appreciated that the device 10 may be used in conjuction with any elongated flexible element and that the term "cable" as used herein is intended to encompass such elements in general. Also, the article 14 has been shown as simply being a large box-like item which is held in place by one or more cables. The article could, however, be a massive farm implement or the like which is secured by cables to a flat-bed railroad car, thus requiring considerable tension in the cables to keep the implement rigidly anchored to the car under the high shock loads normally imposed during rail transit.

The cable 13 may be drawn tightly around the article 14 and tensioned by a cable tensioning device 15 (FIG. 2) which may be of the same type as disclosed in my copending application Serial No. 663,969, filed March 4, 1976, now U.S. Pat. No. 4,013,266. In general, the tensioning device 15 includes a forward head 16 adapted to grip the forward cable section 11 and a rear head 17 adapted to grip the rear cable section 12. When the two heads are spread apart by fluid-operated actuators 19, the forward cable section 11 is pulled forwardly or to the right while the rear cable section 12 is pulled rearwardly or to the left so that tension is imparted to the cable.

Figure 3:
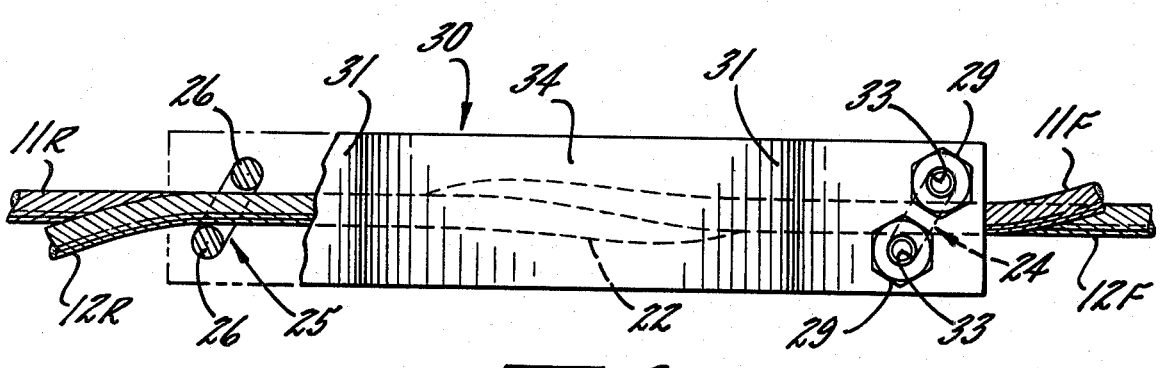
FIG. 3 is a top plan view of the clamp with a portion of the clamp being broken away and shown in section.

To prevent the tension in the cable 13 from throwing the tensioning device 15 off of the cable during tightening of the latter, it is desirable that the two lapped end sections 11 and 12 of the cable be wrapped around one another prior to being loaded into the tensioning device, there thus being a twist 22 (FIG. 3) formed in the cable. The end sections 11 and 12 preferably are wrapped through a twist angle of only 180 degrees although they could be wrapped through an angle which is another odd multiple of 180 degrees such as 540 degrees or 900 degress. As a result of the twist 22, the forward cable section11 includes a forward free end portion 11F extending forwardly or to the right from the twist and further includes a rear portion 11R located rearwardly or to the left of the twist. Similarly, the rear cable section 12 includes a rear free end portion 12R extending rearwardly from the twist 22 and further includes a forward portion 12F located forwardly of the twist. The axes of the forward free end portion 11F and the rear free end portion 12R lie substantially along the same straight line and are disposed above the axes of the rear cable portion 11R and the forward cable portion 12F, whose axes are also in line with one another. When the cable is tensioned, the forward head 16 grips and pulls the forward cable free end portion 11F while the rear head 17 grips and pulls the rear cable free end portion 12R. Reference may be had to my aforementioned application for a more detailed disclosure of the tensioning device 15.

After the cable 13 has been tensioned to the desired degree, the forward free end portion 11F is clamped to the forward cable portion 12F and, in addition, the rear free end portion 12R is clamped to the rear cable portion 11R, such clamping serving to maintain the tension in the cable. The heads 16 and 17 then are released from the cable sections 11 and 12 and the tensioning device 15 is removed from the cable.

The present invention contemplates the provision of a comparatively simple and inexpensive device 10 which not only clamps the cable end sections 11 and 12 together but which also serves as a shocker absorber to enable elongation of the cable 13 when the latter is subjected to a high tensile shock load. Because of the shock absorbing capability of the clamping device 10, the highly tensioned cable is not likely to snap under a shock load but instead may elastically elongate in order to accommodate the shock load.

More specifically, the clamping device 10 includes a pair of aligned eyes 24 and 25 (FIG. 4) which receive the cable end sections 11 and 12 and which preferably are in the form of U-bolts. Each U-bolt 24, 25 opens upwardly and is formed with upright legs 26 whose upper end portions are threaded as indicated at 27 in order to accommodate hex nuts 29.

Figure 4:
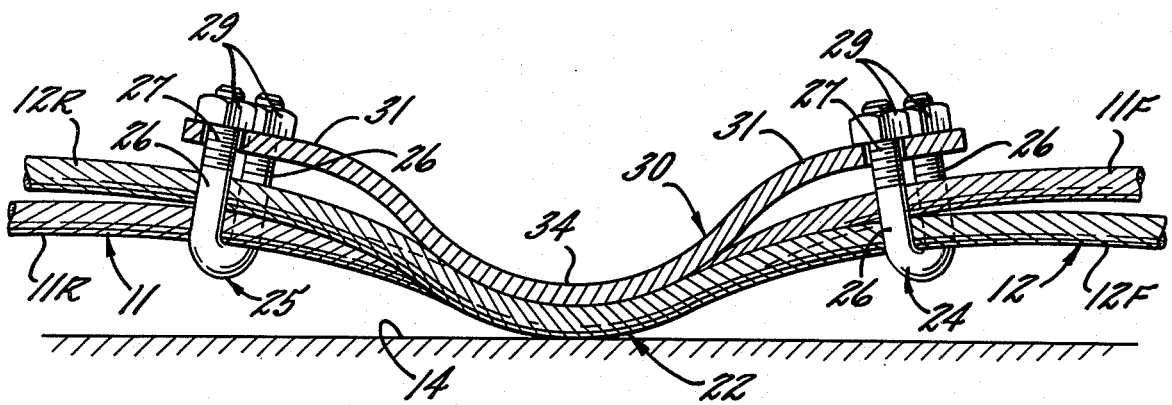
FIG. 4 is a side elevation of the clamp and shows the clamp before the cable has been tensioned.

In carrying out the invention, the cable end sections 11 and 12 are clamped between the U-bolts 24 and 25 and an elongated strap 30 adapted to overlie the cable end sections. The strap is made of resiliently yieldable material such as spring steel and each of its end portions 31 is formed with a pair of holes 33 (FIG. 5) for receiving the legs 26 of the U-bolts 24 and 25. Importantly, the intermediate portion 34 of the strap 30 is bowed downwardly as shown in FIG. 4 and is adapted to flex upwardly when a shock load is applied to the cable. The bowed configureation of the intermediate portion 34 corresponds generally to that of a sine wave with the end portions 31 of the strap being inclined upwardly from the intermedite portion as shown in FIG. 4 when the strap is in an unloaded condition.

To tension and splice the cable 13, the two end sections 11 and 12 are wrapped around the article 14 and are overlapped and twisted. To facilitate lapping and twisting, the cable end sections are placed in the U-bolts 24 and 25 while the latter are detached from the strap 30. Thus, the cable portion 12F is placed in the bottom portion of the forward U-bolt 24 while the cable rear free end portion 12R is placed in the upper portion of the rear U-bolt 25. The cable free end portion 11F is placed in the upper portion of the forward U-bolt 24 and the rear cable portion 11R is placed in the lower portion of the rear U-bolt 25. When thus positioned, the cable sections 11 and 12 overlap one another and are wrapped around one another through an angle of 180 degrees so as to form the twist 22.

The strap 30 next is placed on the U-bolts 24 and 25 in overlying relation with the cable sections 11 and 12. After the cable sections have been drawn together as tightly as possible by hand, the hex nuts 29 are threaded on the U-bolts and are tightended loosely, the degree of tightening being sufficient to hold the cable sections between the U-bolts and the strap but not so great as to prevent the cable sections from moving within the U-bolts when the cable free end portions 11F and 12R are pulled in opposite directions. Advantageously, the holes 33 in the strap 30 are located so as to cause each U-bolt to be positioned in an upright plane which is inclined at an acute angle relative to the cable rather than in a plane disclosed perpendicular to the cable (see FIGS. 3 and 4). As a result of the U-bolts being located in inclined planes, the cable portion 11F is held in vertically superimposed relation with the cable portion 12F in the forward U-bolt 24 while the cable portions 11R and 12R are held in vertically superimposed relation in the rear U-bolt 25. In this instance, inclination of the U-bolts is effected by locating the holes 33 of each pair such that a line disposed in the plane of the holes and extending between the axes thereof is inclined at an acute relative to the cable.

Figure 2:
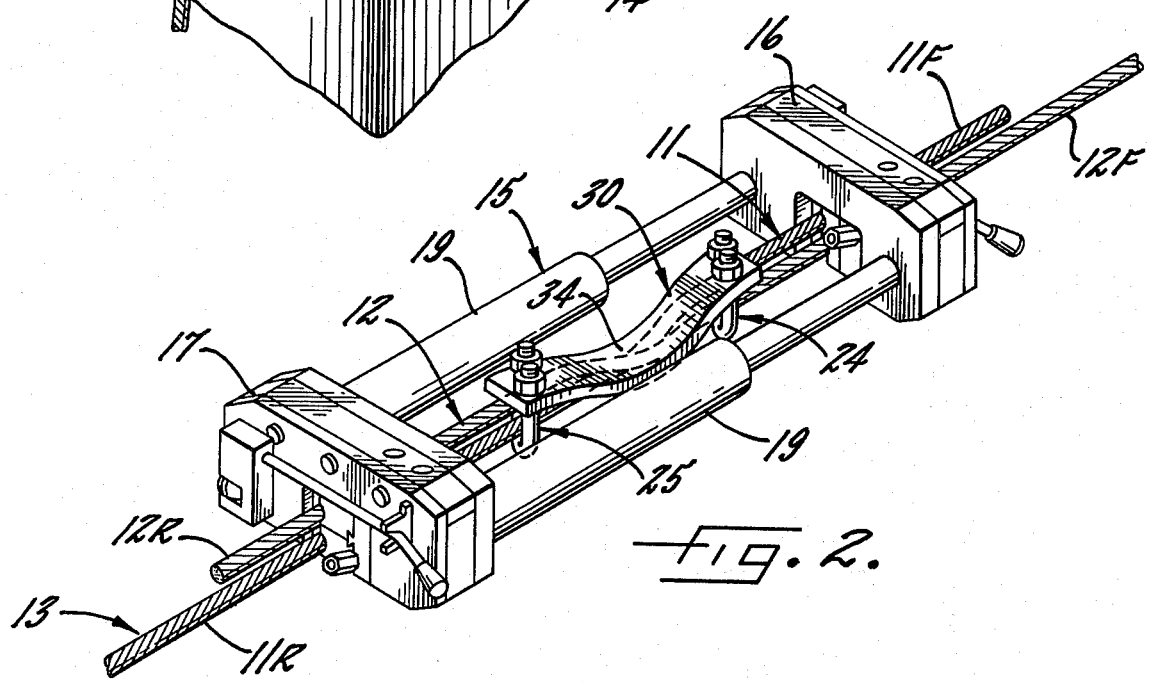
FIG. 2 is a perspective view showing the cable and the clamp and showing a device for tensioning the cable.
Figure 5:
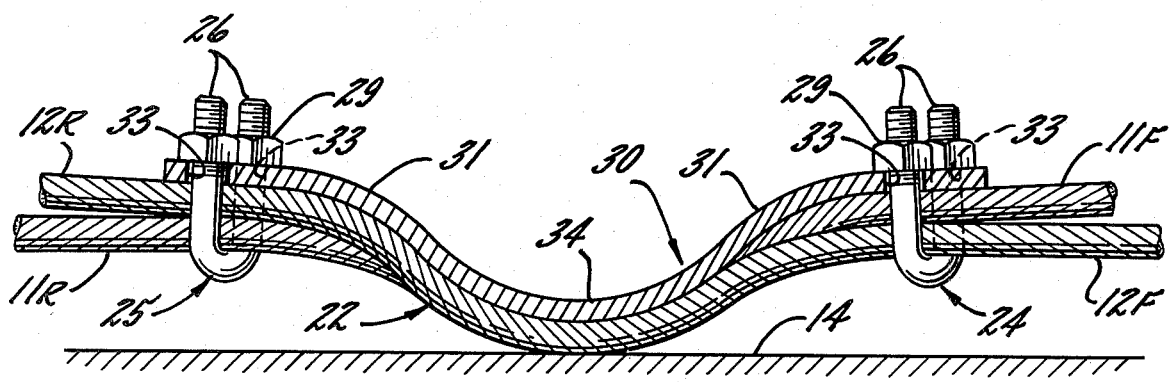
FIG. 5 is a view similar to FIG. 4 but shows the the clamp after the cable has been tensioned.

After the nuts 29 have been loosely tightened, the cable tensioning device 15 is positioned over the cable 13 with the forward head 16 located forwardly of the clamping device 10 and with the rear head 17 located rearwardly of the clamping device as shown in FIG. 2. The actuators 19 then are operated to pull the forward cable free end portion 11F forwardly and the rear cable free end portion 12R rearwardly. As a result, the cable 13 is tensioned and, as an incident thereto, the cable resiliently loads the clamping strap 30 by pulling the end portions 31 thereof downwardly and by forcing the bowed intermediate portion 34 upwardly. The clamping strap thus is forced into a somewhat more flattened condition as shown in FIG. 5.

When the cable 13 has been tensioned to the desired degree, the nuts 29 are tightened securely (see FIG. 5) to clamp the cable end sections 11 and 12 tightly between the U-bolts 24 and 25 and the strap 30 and thereby hold the tension in the cable. The tensioning device 15 then may be lifted from the cable.

Figure 6:
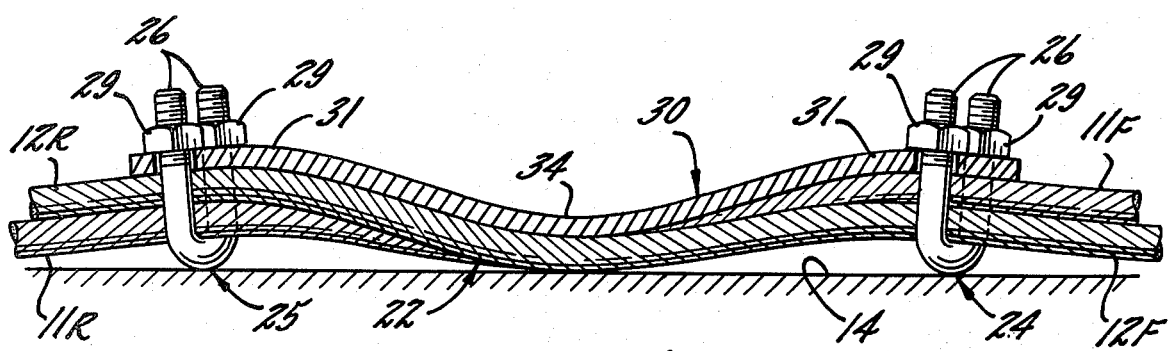
FIG. 6 is a view similar to FIGS. 4 and 5 but shows the clamp when a tensile shock load is applied to the cable.

When the cable 13 is used, for example, to tie the article 14 to a rail car, the cable may be subjected repeatedly to high tensile shock loads when the car jerks and the article tends to shift relative to the car. When a shock load occurs, the clamping device 10 prevents the tensioned cable from snapping by allowing the cable to elongate. Thus, when a shock load imparts additional tension to the cable, the cable pulls the end portions 31 of the strap 30 downwardly and flexes the bowed intermediate portion 34 upwardly (see FIG. 6) so that the cable may gradually elongate and withstand the shock load. When the shock load disappears, the resilient strap 30 recovers and returns to substantially its original condition (FIG. 5) to place the cable under substantially its original tension ---assuming that the cable was not permanently stretched by the shock load. If permanent stretching of the cable should occur, the strap 30 upon recovering will take up the physical slack in the cable and keep the cable tight against the article even though some of the original tension may have been lost.

From the foregoing, it will be apparent that the present invention brings to the art a new and improved cable clamp 10 which serves to splice the end sections 11 and 12 of the cable 13 together while allowing the cable to accommodate shock loads. The device need not necessarily be used as a splice but may indeed be used simply as a shock absorber along an intermediate portion of a cable. Because of its simple construction, the device is so inexpensive that it may be treated as a throw-away item after once being used.

I claim:

1. A shock absorbing clamp for securing together the two end portions of a cable, said clamp comprising first and second U-bolts each adapted to receive the end portions of the cable, an elongated strap overlying the end portions of the cable and having first and second end portions formed with holes for receiving the legs of the respective U-bolts, said strap being made of resiliently yieldable material and having an intermediate portion which is bowed downwardly away from the end portions of the strap and toward the end portions of the cable, and nuts threaded onto the legs of said U-bolts above said strap for clamping the end portions of the cable between the U-bolts and the strap with the underside of the strap disposed in engagement with the cable, the bowed portion of said strap flexing upwardly when said cable is subjected to a high tensile shock load and enabling elongation of said cable when such shock load occurs.

2. A clamp as defined in claim 1 in which a pair of holes is formed in each end portion of said strap, the two holes of each pair being located such that a line disposed in the plane of the holes of each pair and extending between the axes thereof is inclined at an acute angle relative to the cable.

3. A clamp as defined in claim 1 in which each U-bolt is disposed in an upright plane which is inclined at an acute angle relative to the cable and the longitudinal centerline of said strap thereby to maintain the two end portions of the cable in superimposed positions in the U-bolt.

4. A shock absorbing device for enabling elongation of a tensioned cable when a tensile shock load is exerted on the cable, said device comprising a strap having first and second end portions and having a bowed intermediate portion projecting from said end portions, aligned eyes on said first and second end portions and projecting from said end portions in the same direction as said bowed portion, the cable being threaded through each of said eyes and being located between said eyes and said strap, means for drawing said eyes toward said strap and thereby clamping the cable between said eyes and said strap, said strap being made of resiliently yieldable material to enable said bowed portion to flex to a more nearly less bowed condition and thereby permit elongation of the cable when a tensile shock load is exerted on the cable.

5. A method of tensioning and splicing a cable having first and second end portions, said method comprising the steps of, drawing the cable end portions into overlapping relation and placing each end portion into each of a pair of aligned eyes, loosely securing to the eyes a resiliently yieldable strap having a bowed intermediate portion located in engagement with the lapped cable end portions, pulling one of the cable end portions in one direction away from one end of the strap while pulling the other cable end portion in the opposite direction away from the opposite end of the strap thereby to impart tension to the cable, and, while maintaining said tension, drawing said eyes toward said strap and tightly securing said eyes to said strap to clamp the cable end portions between the eyes and the strap.

6. A method as defined in claim 5 further including the step of wrapping the cable end portions around one another as an incident to drawing the end portions into overlapping relationship, the end portions being wrapped around one another through an angle which is an odd multiple of 180 degrees whereby the first cable end portion within one of said eyes is located next to said strap while the second cable end portion in the other of said eyes is also located next to said strap.

* * * * *